Sept. 21, 1926.

A. T. WOODS 1,600,264

BEET DIGGING AND TOPPING MACHINE

Filed Dec. 14, 1925    2 Sheets-Sheet 1

INVENTOR.
ALBERT T. WOODS
BY
ATTORNEY.

Sept. 21, 1926.                                                  1,600,264
                          A. T. WOODS
                   BEET DIGGING AND TOPPING MACHINE
                     Filed Dec. 14, 1925       2 Sheets-Sheet 2
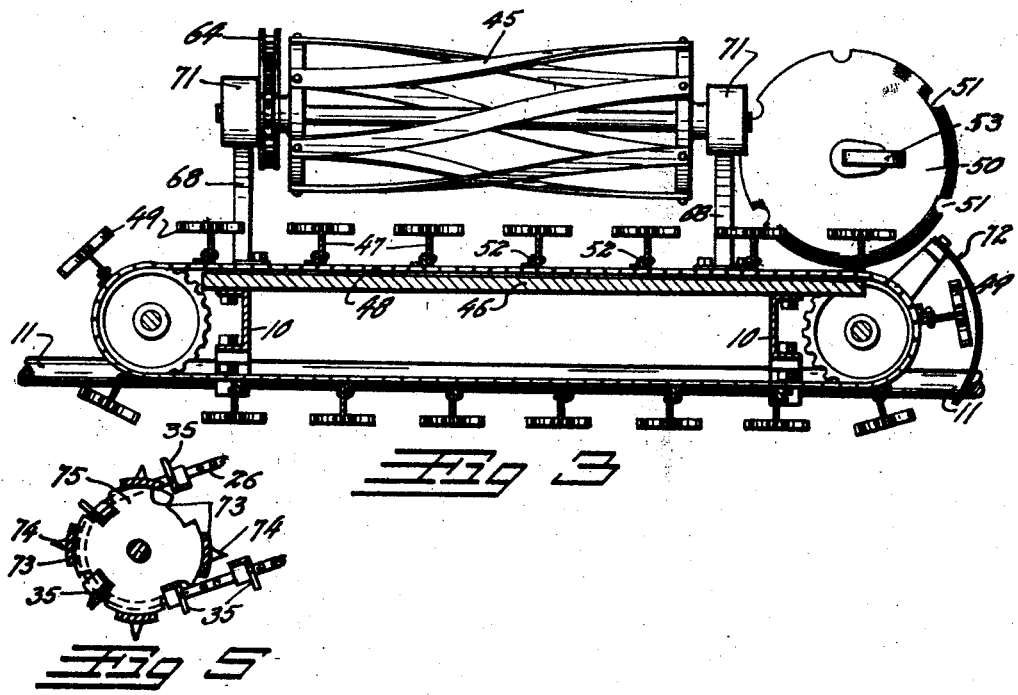
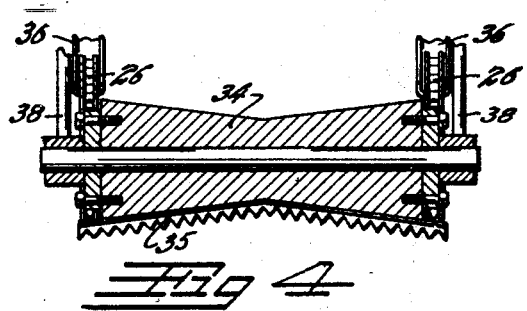
INVENTOR.
ALBERT T. WOODS
BY
ATTORNEY.

Patented Sept. 21, 1926.

1,600,264

UNITED STATES PATENT OFFICE.

ALBERT T. WOODS, OF PLACERVILLE, COLORADO.

BEET DIGGING AND TOPPING MACHINE.

Application filed December 14, 1925. Serial No. 75,272.

This invention relates to a machine for digging sugar beets and the like and cutting the tops from the same, and has for its principal object the provision of an efficient device of this character with which the tops may be accurately cut from the beets as they are dug, with a minimum of manual labor.

Another object is to provide means by which an operator may assist the machine when necessary and control the cutting knife so as to cut the top from the beet at the proper depth.

Other objects and advantages reside in the details of construction of the invention, which is designed for simplicity, economy, and efficiency. These will become more apparent from the following description.

In the following detailed description of the invention, reference is had to the accompanying drawing which forms a part hereof. Like numerals refer to like parts in all of the views of the drawing and throughout the description.

In the drawing:

Fig. 3 is an enlarged, partial cross section taken on the line 3—3, Fig. 1.

Fig. 4 is a detail longitudinal section through the lower elevator roller.

Fig. 5 is a cross sectional view through an alternate form of the lower elevator roller.

Figure 1:
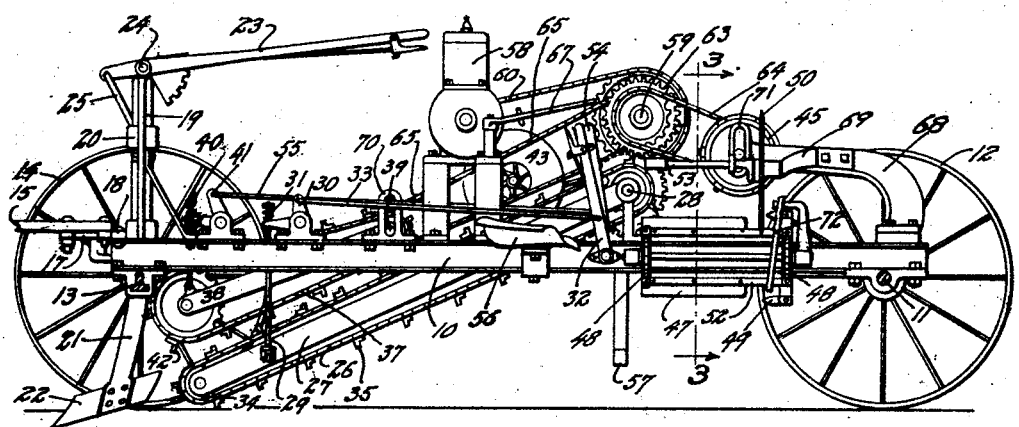
Fig. 1 is a side elevation of my improved beet digging and topping machine, with the near side wheels cut away.
Figure 2:
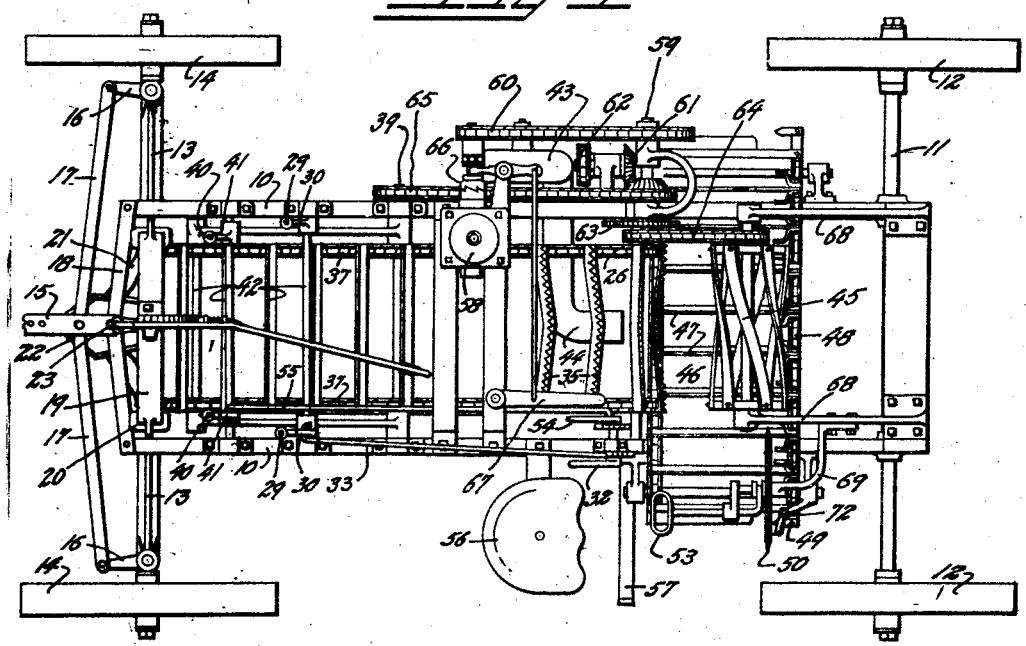
Fig. 2 is a plan view of the complete digging and topping machine.

Broadly speaking, the device is a machine, arranged to be driven along the row of beets in the field, which will dig the beets; elevate the beets, top first, onto a laterally traveling table having a series of pockets for the reception of individual beets; draw the beets in their pockets against a guide; and pass the beets under a rotating knife which will sever the tops from the beets and deliver them to any desired mechanism or receptacle.

The above is accomplished by means of a supporting frame 10, supported at one extremity upon a rear axle 11, terminating in rear wheels 12, and at the other extremity upon a front axle 13 terminating in guide wheels 14. At the forward extremity of the frame 10, upon a cross bar 18, a draft bar 15 is pivoted, by means of which the machine is drawn through the medium of a tractor or horses. The draft bar is connected to steering spindles 16, carried upon the guide wheel axles, by means of connecting bars 17. By this construction, any turning movement of the draft bar is communicated to the guide wheels 14, thus allowing the machine to be turned within a very small radius. The axles 13 extend sufficiently beyond the frame 10 so that the guide wheels may be turned substantially parallel therewith, thus allowing the machine to rotate about the rear axle 11 as a pivot.

The front axle 13 extends upward after entering the frame 10, as indicated at 19, Fig. 4, forming an inverted U. Slidably mounted as shown at 20, upon the upward extending portions 19 of the axle 13, is a plow frame 21, also in the shape of an inverted U, and terminating at its lower extremity in any of the usual beet digging plows 22. The plow frame is elevated or lowered through the medium of a plow lifting lever 23 pivoted on the axle 13, as shown at 24, and connected by means of a link 25 with the plow frame 21.

The beets are received from the plow 22 upon an elevator chain 26 carried on an elevator frame 27. The frame 27 is pivoted at its rearward extremity upon an elevator drive shaft 28 and is supported at its forward extremity upon supporting rods 29. These supporting rods 29 depend from bell-crank levers 30, in which they are slidably mounted and supported on springs 31. This arrangement allows the supporting rods to rise through the bell-crank levers should the elevator strike an obstruction. The height of the lower extremity of the elevator is controlled by means of an elevator lever 32, connected to the bell-crank-lever by means of a connecting rod 33. The elevator chain 26 passes over a solid drum 34 at its lower limit of travel and over the sprockets carried on the elevator drive shaft at its upper limit of travel.

The elevating chains 26 are connected at spaced intervals by means of flights 35. The flights 35 comprise angle bars bent so as to form a trough which will maintain the beets along the center line of the elevator as they ascend. The projecting leg of the angle bars forming the flights 35 is preferably notched, as illustrated in Fig. 5, to exert a greater tractive effort on the beets. By having the solid drum 34 at the lower extremity of the elevator, a backing or support for the cross bars 35 is provided at this point, which prevents them from being bent out of shape by striking obstructions on the ground. The elevating chains 26 travel in channel tracks 36 as they ascend, which maintains them in alignment.

To cause the beets to enter the elevator top first, I provide a rake chain 37 supported in a rake frame 38 which is pivoted at its upper extremity upon a rake drive shaft 39 and which is suspended at its lower extremity upon hangers 40 depending from a second bell-crank lever 41. The hangers 40 are arranged similarly to the supporting rods 29 so that the rake frame may be forced upward without affecting the bell-crank lever 41. The bell crank lever 41 connects with a rake operating lever 54 through the medium of a connecting rod 55. The rake chains 37 are connected by means of spaced bars 42 which engage the beet tops and draw them rearwardly between the rake chains and elevator chains, thus causing the tops to enter the elevator before the beets do.

When the beets reach the upper extremity of the elevator, their tops will be blown rearwardly by means of a blower 43 which forces air into an air pipe 44, arranged to blow between the flights 35 as they pass around the upper sprockets.

The beets fall from the elevator upon a stationary receiving table 46, over which a series of partitions 47 travel. The partitions 47, secured to angle bars 52, are carried by lateral chains 48 and act to form a series of compartments which separate and contain the individual beets.

The rearwardly blown tops will be engaged by a revolving slatted drum wheel 45 which will draw the beets rearwardly in their compartments. As the beets are drawn rearward, they will impinge upon pointed hooks 49 carried by the partitions 47. The hooks 49 serve to align and hold the beets in alignment so that, as the chains 48 travel, they will be carried under a rotating knife 50 which severs them from their tops.

The knife 50 is notched as shown at 51, the notches 51 being spaced so that they will engage the angle bars 52 as they pass under the knife, thus serving to keep the knife rotating in unison with the chains 48. The partitions 47 terminate sufficiently far in front of the knife 50 to allow a space between the partitions and the hooks 49 in which the knife will operate. The knife 50 is slidably mounted upon its shaft and is moved therealong by means of an operating handle 53 so that the amount cut from the beet can be regulated manually.

The operating handle 53, and the levers 23, 32 and 54 are arranged within reach of a machine operator who is seated upon a seat 56 to one side of the frame 10, with his feet upon a foot rest 57. This operator can watch the beets as they travel before him on the table 46 and, if necessary, separate them into their compartments and align them, should the roller 45 not be sufficient to accomplish this operation. He can also determine the point at which the individual beets should be topped and by moving the operating handle 53, can top them accurately at this point.

The beets and their tops leave the table 46 separated and fall upon the ground or into suitable containers (not shown) carried by the machine, or upon an elevating belt (not shown) which will place them into wagons being driven along side of the machine. These latter details are not illustrated since they form no part of the invention and are in use upon other devices of similar nature.

The moving parts of the machine are actuated from an engine 58 which drives a countershaft 59 through the medium of a drive chain 60. The drive chain 60 also passes over a sprocket upon the blower 43 and actuates the same. The lateral chains are driven from the countershaft 59 through the medium of bevel gears 61 and a vertical chain 62. The elevator is driven from the countershaft 59 through the medium of spur gears 63. The roller 45 is driven from the countershaft 59 through the medium of a sprocket chain 64 and the rake chains are driven from the countershaft 59 through the medium of a sprocket chain 65. The engine 58 may be disconnected from the machine by means of a clutch 66 operated from a clutch lever 67 within reach of the operator.

The slatted drum wheel 45 is supported on an arm 68 which arches rearwardly to allow room for the passage of the tops. The knife 50 is carried from a bracket 69 which is secured to one of the arms 68.

To allow the rake chain to accommodate various sizes of beets, its upper shaft 39 is carried in a slotted bearing 70 which allows the shaft to be pushed upward should an unusually large beet be carried past on the elevator. The drum wheel 45 is also carried in a slotted bearing 71 to allow it to raise should a large beet attempt to pass under it.

To remove the tops from the hooks 49 after they have been cut from the beets, I provide an angularly placed pusher bar 72 against which the tops will bear as they are swung around the sprockets of the chain 48, and which serve to push them from the hooks 49.

In place of the solid drum, illustrated in Fig. 5, a hollow drum, illustrated in Fig. 6, may be employed, consisting of a series of relatively heavy, spaced apart bars 73, between which the elevator flights 35 will pass. The bars 73 are provided with teeth 74. The elevator flights will pass below the surface of the bars 73, allowing the latter to engage the beets upon the ground. The strain of striking the beets will then be borne by these heavy bars allowing the flights 35 to be made of lighter construction.

While a specific form of the improvement has been described and illustrated herein, it is desired to be understood that the same may be varied within the scope of the appended claims without departing from the spirit of the invention.

Having thus described the invention, what I claim and desire secured by Letters Patent is:—

1. In a beet digging machine, means for elevating the dug beets; transversely traveling means for receiving the beets from said elevating means; a rotating knife arranged to sever the tops from said beets as they travel on said latter means, said transversely traveling means comprising a series of spaced partitions arranged to form compartments for said beets, said knife arranged to pass across said compartments over said partitions; and projections in said compartments to hold the beets in alignment therein, said projections comprising pointed hooks arranged to project into said beets and maintain them in said compartments.

2. In a beet digging machine, means for elevating the dug beets; transversely traveling means for receiving the beets from said elevating means; a rotating knife arranged to sever the tops from said beets as they travel on said latter means; and a rotating drum arranged above said transversely traveling means and adapted to draw the beets toward the rearward side thereof.

3. In a beet digging machine, means for elevating the dug beets comprising, a traveling series of spaced bars; a table for receiving the beets from said elevating means; and a blower arranged to blow the tops rearwardly over said table as they emerge from said elevating means.

4. Means for topping beets and the like comprising a table arranged to receive said beets; said table being divided into a series of compartments by means of traveling partitions; and a rotating knife arranged above said table and adapted to cut through said beets as they are carried thereunder by said partitions, said knife being slidably mounted upon its shaft so that the point at which it cuts into the beet may be manually adjusted.

5. In a beet digging machine, the combination of an inclined elevator adapted to receive the dug beets and comprising a series of traveling spaced bars; means for raking the beets into said elevator comprising a second series of traveling spaced bars; means for receiving the beets from said elevator comprising a laterally traveling series of compartments; and means for drawing the beets into alignment in their individual compartments comprising a slatted drum wheel arranged to rotate above said compartments; and means for cutting the tops from said beets comprising a knife arranged to rotate above said compartments and at right angles thereto.

In testimony whereof, I affix my signature.

ALBERT T. WOODS.